United States Patent
Nagura et al.

(10) Patent No.: US 9,701,219 B2
(45) Date of Patent: Jul. 11, 2017

(54) VEHICULAR SEAT SLIDE DEVICE

(71) Applicant: AISIN SEIKI KABUSHIKI KAISHA, Kariya (JP)

(72) Inventors: Mikihito Nagura, Okazaki (JP); Atsushi Abaka, Kariya (JP); Naoaki Hoshihara, Obu (JP); Tateki Kawamura, Inazawa (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/117,287

(22) PCT Filed: Feb. 5, 2015

(86) PCT No.: PCT/JP2015/053189
§ 371 (c)(1),
(2) Date: Aug. 8, 2016

(87) PCT Pub. No.: WO2015/122339
PCT Pub. Date: Aug. 20, 2015

(65) Prior Publication Data
US 2017/0008425 A1    Jan. 12, 2017

(30) Foreign Application Priority Data
Feb. 12, 2014  (JP) .................................. 2014-024618

(51) Int. Cl.
*A47B 97/00* (2006.01)
*B60N 2/12* (2006.01)
(Continued)

(52) U.S. Cl.
CPC .......... *B60N 2/123* (2013.01); *B60N 2/0705* (2013.01); *B60N 2/0715* (2013.01); *B60N 2/085* (2013.01);
(Continued)

(58) Field of Classification Search
USPC ....................................................... 248/503.1
See application file for complete search history.

(56) References Cited

U.S. PATENT DOCUMENTS

| | | | | |
|---|---|---|---|---|
| 6,520,474 B2 * | 2/2003 | Yoshida | ................. | B60N 2/071 248/424 |
| 7,066,521 B2 * | 6/2006 | Jung | .................... | B60N 2/0705 248/430 |

(Continued)

FOREIGN PATENT DOCUMENTS

JP    2011-201434 A    10/2011

OTHER PUBLICATIONS

International Search Report issued Mar. 24, 2015 in PCT/JP2015/053189 filed Feb. 5, 2015.
(Continued)

*Primary Examiner* — Monica Millner
(74) *Attorney, Agent, or Firm* — Oblon, McClelland, Maier & Neustadt, L.L.P.

(57) ABSTRACT

A vehicular seat slide device is provided with a lower an upper rail, a lock member, a memory piece, a memory link, a slide member, and a stopper member. The memory piece is engaged with the upper rail and the lower rail. The memory link releases the lock member and the memory piece with urging force of a memory link urging member, and pivots in a releasing direction to press the lock member in a pivot direction and press the memory piece against the urging force of the memory piece urging member. The slide member releases the memory link with urging force of a slider urging member, and presses the memory link in the release direction by moving as a seat back is collapsed forward. After the seatback is collapsed forward and the upper rail is moved in a seat-rearward direction, the stopper member contacts the memory piece.

5 Claims, 8 Drawing Sheets

(51) Int. Cl.
 *B60N 2/07* (2006.01)
 *B60N 2/08* (2006.01)
 *B60N 2/20* (2006.01)

(52) U.S. Cl.
 CPC ......... *B60N 2/0818* (2013.01); *B60N 2/0862* (2013.01); *B60N 2/20* (2013.01)

(56) References Cited

U.S. PATENT DOCUMENTS

| | | | | |
|---|---|---|---|---|
| 8,066,314 B2* | 11/2011 | Tamura | ..................... | B60R 5/04 296/26.09 |
| 8,201,798 B2* | 6/2012 | Nihonmatsu | ........ | B60N 2/0705 248/430 |
| 8,393,591 B2* | 3/2013 | Mizuno | ................ | B60N 2/0705 248/424 |
| 8,408,649 B2* | 4/2013 | Ito | ........................ | B60N 2/0705 297/340 |
| 8,528,974 B2* | 9/2013 | Nihonmatsu | ............ | B60N 2/06 248/419 |
| 8,936,227 B2* | 1/2015 | Kawamura | .............. | B60N 2/08 248/429 |
| 9,038,981 B2* | 5/2015 | Hoshihara | ................ | B60N 2/06 248/429 |
| 9,145,069 B2* | 9/2015 | Yamada | .................... | B60N 2/07 |
| 9,162,588 B2* | 10/2015 | Yamada | ................ | B60N 2/0722 |
| 9,327,615 B2* | 5/2016 | Yamada | ................ | B60N 2/0705 |
| 9,457,691 B2* | 10/2016 | Yamada | ............... | B60N 2/0732 |
| 9,511,686 B2* | 12/2016 | Garotte | ................ | B60N 2/0705 |
| 2008/0238168 A1* | 10/2008 | Kojima | ................ | B60N 2/0722 297/344.11 |
| 2010/0090084 A1* | 4/2010 | Moriyama | ........... | B60N 2/0727 248/430 |
| 2011/0233369 A1* | 9/2011 | Nihonmatsu | ........ | B60N 2/0705 248/429 |
| 2011/8239307 | 9/2011 | Mizuno et al. | | |
| 2011/0298264 A1 | 12/2011 | Ito et al. | | |
| 2012/0032058 A1 | 2/2012 | Nihonmatsu et al. | | |

OTHER PUBLICATIONS

International Preliminary Report on Patentability and Written Opinion issued Aug. 16, 2016 in PCT/JP2015/053189 (submitting English language translation only).

* cited by examiner

Front ← → Rear

Front ← → Rear

VEHICULAR SEAT SLIDE DEVICE

TECHNICAL FIELD

The present invention relates to a vehicle seat slide device.

BACKGROUND ART

Patent document 1 discloses an example of a conventional vehicle seat slide device. As shown in FIG. 9, the vehicle seat slide device includes a lower rail 110, an upper rail 120, which is coupled to the lower rail 110 in a relatively movable manner, and a lock member (not shown), which selectively allows and restricts the relative movement of the upper rail 120 to the lower rail 110.

A memory piece 130 is located in the lower rail 110. The memory piece 130 includes a pin that is movable in the vertical direction. When the pin is moved upward by an upward urging force of a memory piece urging member 132, the memory piece 130 disengages the pin from the lower rail 110. Consequently, the memory piece 130 is engaged with the upper rail 120. When the pin is moved downward by a downward urging force, which counters the urging force of the memory piece urging member 132, the pin engages the lower rail 110. Consequently, the memory piece 130 is disengaged from the upper rail 120.

An unlocking lever 141 and a memory actuation lever 142 are located above the upper rail 120 and pivotally coupled to the upper rail 120. The memory actuation lever 142 is coupled to the unlocking lever 141 by a coupling lever 143.

The unlocking lever 141 is held at an initial pivot position where the lock member is released by the urging force of a lever urging member (not shown). When the seatback is inclined frontward (hereafter, also referred to as "collapsed forward"), the unlocking lever 141 pivots against the urging force of the lever urging member and presses the lock member in a pivot direction that cancels the restriction of the relative movement. Hereafter, this operation may be also referred to as "unlocking."

When the unlocking lever 141 is held at the initial pivot position, the memory actuation lever 142 is held at an initial pivot position at which the memory actuation lever 142 releases the memory piece 130. When the seatback is collapsed forward, the unlocking lever 141 and the coupling lever 143 pivots the memory actuation lever 142 and downwardly presses the pin of the memory piece 130. Hereafter, this operation may also be referred to as "memory actuation."

A memory holding bracket 135 is fixed to the upper rail 120. When the upper rail 120 is moved in a seat-frontward direction after the seatback is collapsed forward, the memory holding bracket 135 is located above the memory piece 130 (pin) and maintains the engaged state of the memory piece 130 (pin) with the lower rail 110.

Additionally, a stopper member 136 is fixed to a front end of the upper rail 120. When the upper rail 120 moves in the seat-rearward direction after being moved in a seat-frontward direction by the forward collapsing of the seatback, the stopper member 136 contacts the memory piece 130 to restrict the seat-rearward movement at the relative position (memorized relative position) of the lower rail 110 and the upper rail 120 prior to the movement.

PRIOR ART DOCUMENT

Patent Document

Patent Document 1: Japanese Laid-Open Patent Publication No. 2011-201434

SUMMARY OF THE INVENTION

Problems that are to be Solved by the Invention

In the device of patent document 1, the unlocking lever 141 and the memory actuation lever 142 need to be pivoted above the upper rail 120 in order to perform unlocking and memory actuation when the seatback is collapsed forward. Thus, a large space is necessary for the unlocking and the memory actuation.

It is an object of the present invention to provide a vehicle seat slide device that reduces a space needed to perform the unlocking and the memory actuation when the seatback is collapsed forward.

Means for Solving the Problem

To achieve the above object, one aspect provides a vehicle seat slide device adapted for a seat including a seatback. The vehicle seat slide device includes a lower rail and an upper rail coupled to each other in a manner movable relative to each other, a lock member that selectively allows and restricts relative movement of the lower rail and the upper rail, a memory piece located in the lower rail, a memory link pivotally coupled to the upper rail in the upper rail, a slide member coupled to the upper rail in a manner movable in a direction of the relative movement, and a stopper member fixed to the upper rail. The memory piece is engaged with the upper rail by urging force of a memory piece urging member. The memory piece is engaged with the lower rail by pressing force that counters the urging force. The memory link releases the lock member and the memory piece with urging force of a memory link urging member. The memory link pivots in a releasing direction to press the lock member in a pivot direction in which restriction of the relative movement is cancelled and press the memory piece against the urging force of the memory piece urging member. The slide member releases the memory link with urging force of a slider urging member. The slide member moves to press the memory link in the releasing direction when the seatback is collapsed forward. After the seatback is collapsed forward and the upper rail is moved in a seat-frontward direction, when the upper rail is moved in a seat-rearward direction, the stopper member contacts the memory piece and restricts seat-rearward movement of the upper rail at a relative position of the lower rail and the upper rail prior to the movement.

EMBODIMENTS OF THE INVENTION

One embodiment of a vehicle seat slide device adapted for a seat including a seatback will now be described. Hereafter, a front-rear direction of a vehicle is referred to as the "front-rear direction."

Figure 8:
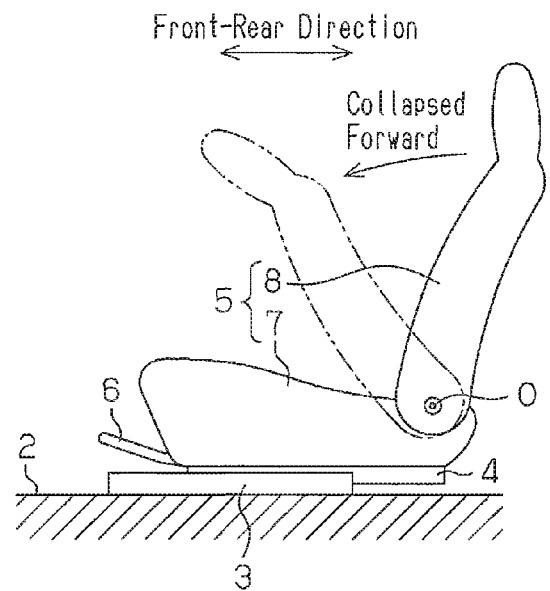
FIG. 8 is a side view of a vehicle seat to which the present invention is applied.
Figure 9:
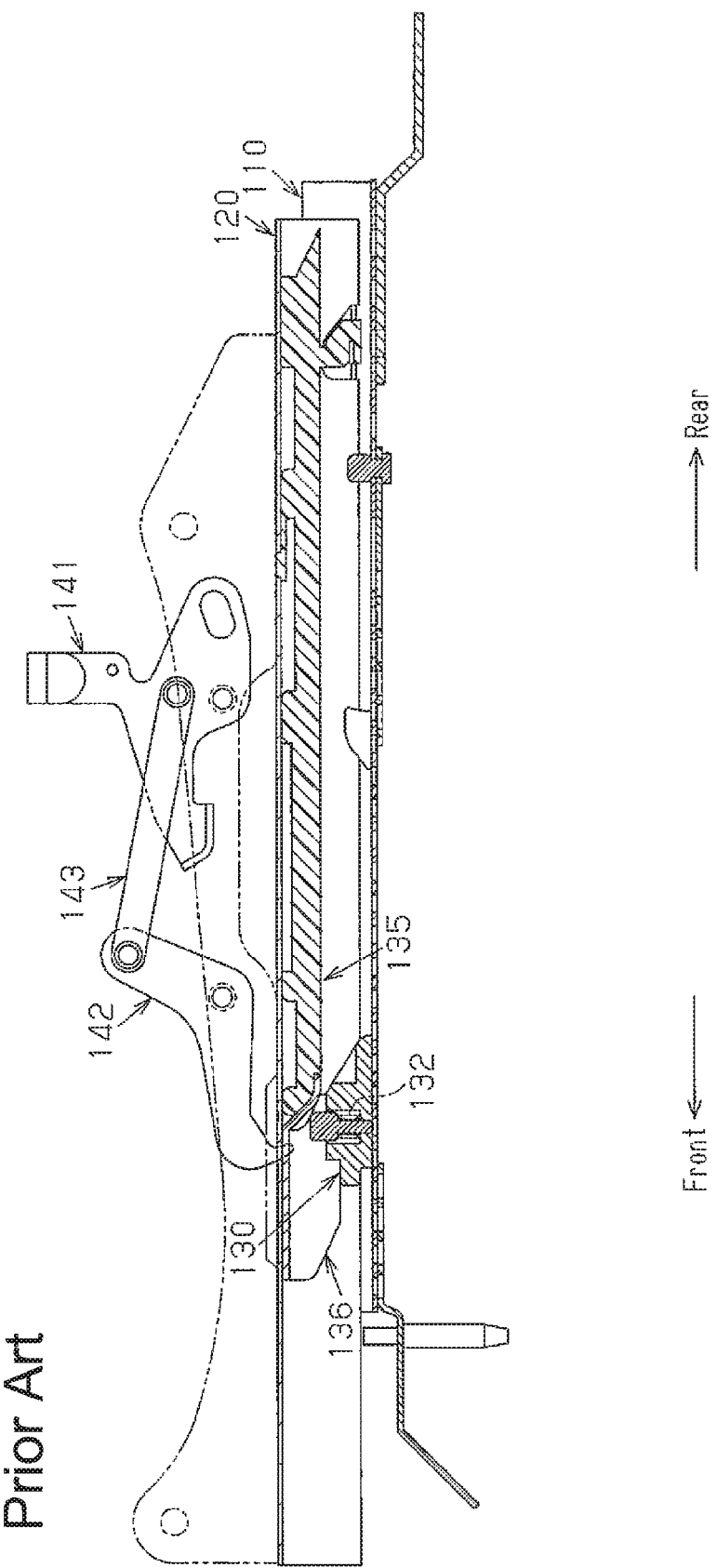
FIG. 9 is a vertical cross-sectional view of a vehicle seat slide device in the prior art.

As shown in FIG. 8, a lower rail 3 is fixed to a vehicle floor 2 and extended in the front-rear direction. An upper rail 4 is attached to the lower rail 3 and movable relative to the lower rail 3 in the front-rear direction. Thus, in the present embodiment, the longitudinal direction of the lower rail 3 and the upper rail 4 and a direction (seat front-rear direction) in which the lower rail 3 and the upper rail 4 relatively move conform to the front-rear direction.

Figure 1:
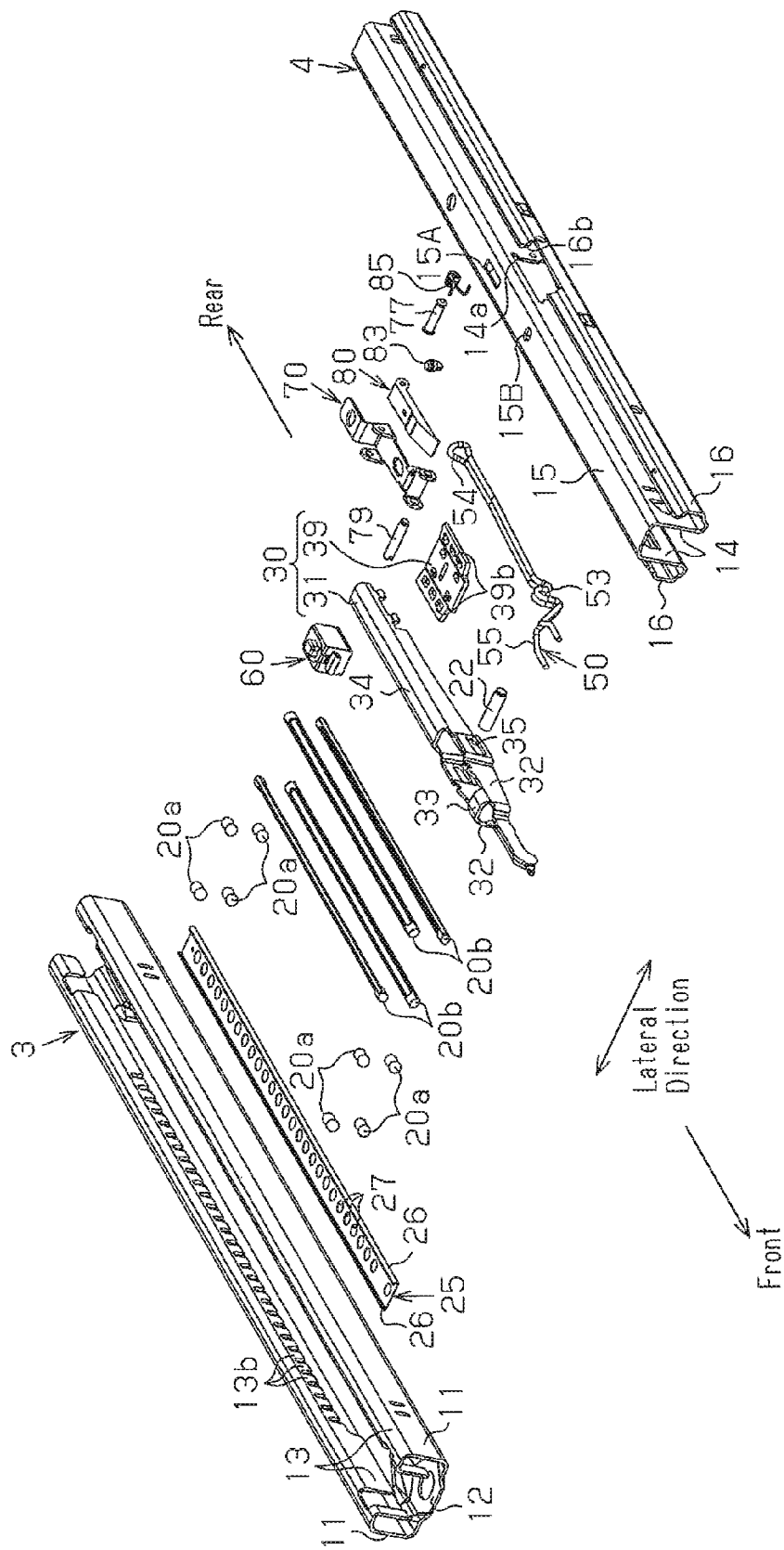
FIG. 1 is an exploded perspective view showing one embodiment of the present invention.

Two pairs of the lower rail 3 and the upper rail 4 are arranged next to each other in a lateral direction (direction orthogonal to the plane of FIG. 1). FIG. 1 shows the lower rail 3 and the upper rail 4 that are located at the left side in a view toward the front. A seat 5, which defines a seat portion for a vehicle occupant, is fixed to and supported by the upper rails 4. The seat 5 includes a seat cushion 7, which defines a seat surface, and a seatback 8, which is supported at a rear end of the seat cushion 7 and inclinable about a pivot axis O, The relative movement of the lower rail 3 and the upper rail 4 is basically restricted. A releasing handle 6 cancels the restricted state.

As shown in FIG. 1, the lower rail 3, which is formed by a plate material, includes two first vertical walls 11, which vertically extend from laterally opposite sides, and a bottom wall 12, which connects lower ends of the first vertical walls 11. Upper ends of the first vertical walls 11 are continuous with first flanges 13 that extend from the first vertical walls 11 laterally inward and then bend downward.

Figure 2:
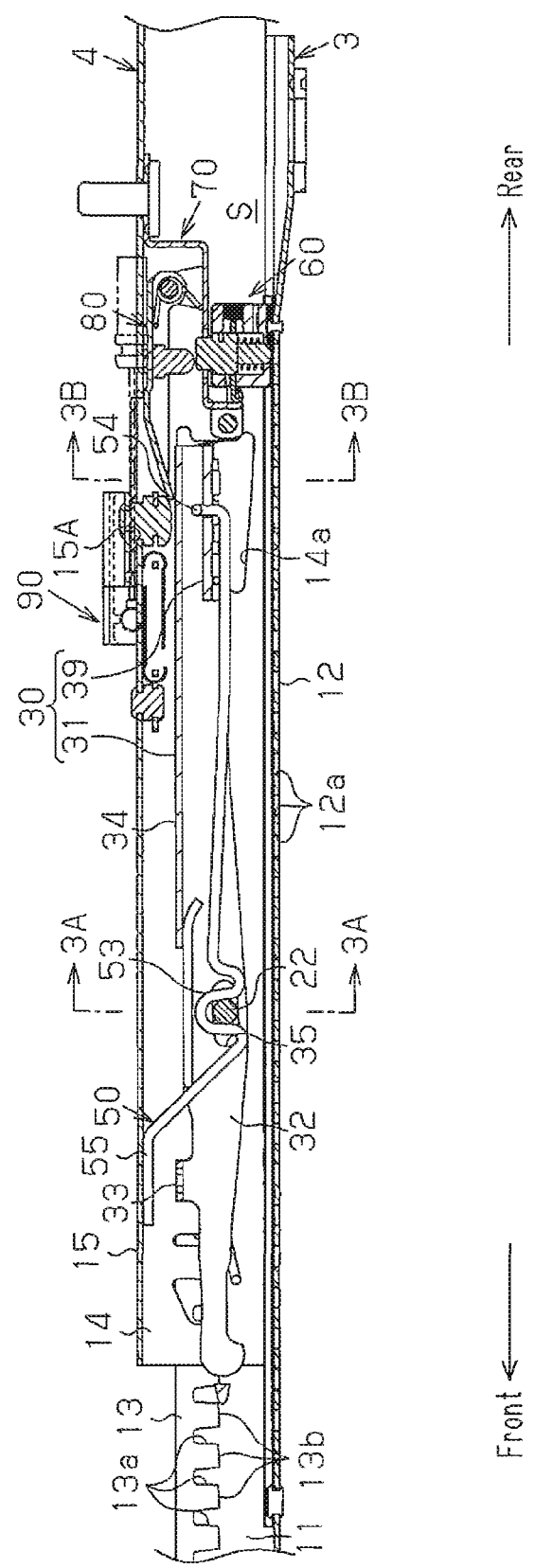
FIG. 2 is a vertical cross-sectional view of the embodiment.

Also, referring to FIG. 2, a longitudinal intermediate portion of each first flange 13 of the lower rail 3 includes slots 13a that are arranged at a predetermined longitudinal interval and extend upward from an end (lower end) of the intermediate portion. Engagement claws 13b having the form of tetragonal teeth are located between adjacent ones of the slots 13a. Thus, the engagement claws 13b are arranged in the longitudinal direction of the lower rail 3 at the predetermined interval.

Figure 3A:
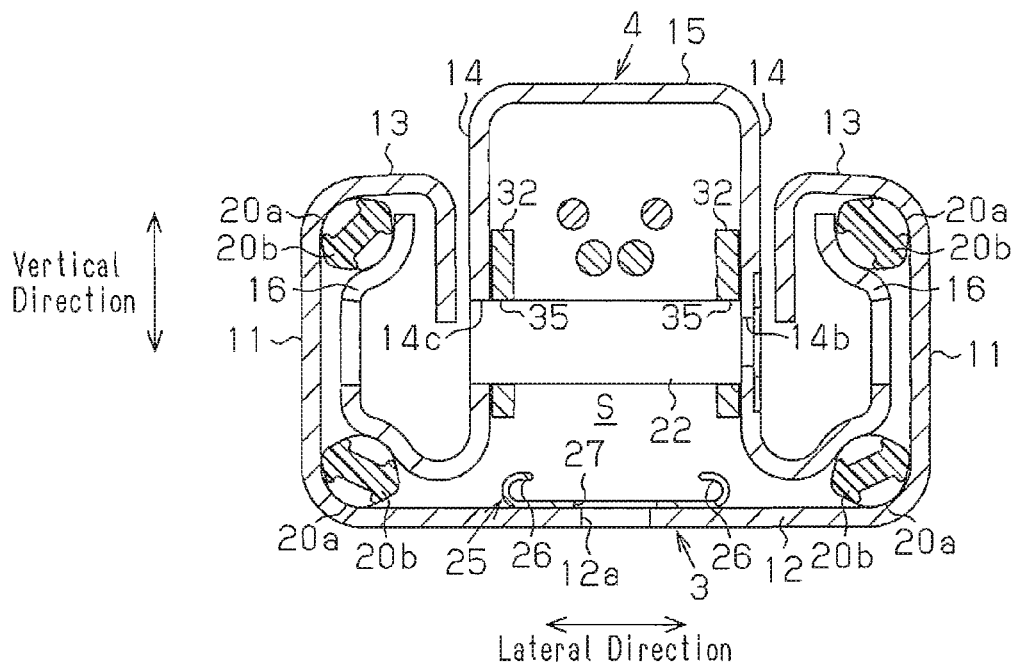
FIG. 3A is a cross-sectional view taken along line 3A-3A in FIG. 2.

As shown in FIG. 3A, the upper rail 4, which is formed by a plate material, includes two second vertical walls 14, which vertically extend between the first flanges 13 of the lower rail 3, and a cover wall 15, which connects upper ends of the second vertical walls 14. Lower ends of the second vertical walls 14 are continuous with second flanges 16 that extend laterally outward and then bend so that each second flange 16 is surrounded by the first vertical wall 11 and the first flange 13.

More specifically, the lower rail 3 and the upper rail 4 have U-shaped cross-sections with openings opposed to each other. Separation of the upper rail 4 from the lower rail 3 in the vertical direction is mainly restricted by the engagement of the first flanges 13 with the second flanges 16. The cross-sections of the lower rail 3 and the upper rail 4 are rectangular, or box-shaped. The lower rail 3 cooperates with the upper rail 4 to define a void S.

Spherical balls 20a are located between a lower end portion of each second flange 16 and a connection portion of the first vertical wall 11 and the bottom wall 12 that is opposed to the second flange 16. Additionally, spherical balls 20a are located between an upper end portion of each second flange 16 and a connection portion of the first flange 13 and the first vertical wall 11 that is opposed to the second flange 16. As shown in FIG. 1, each ball 20a is attached to a resin holder 20b that extends in the front-rear direction (longitudinal direction of rail). In each holder 20b, two balls 20a are located on a front end and two balls 20a are located on a rear end. In total, four balls 20a are attached to the holder 20b. The upper rail 4 is supported by the lower rail 3 and slidable relative to the lower rail 3 in the longitudinal direction (front-rear direction) when the balls 20a roll between the upper rail 4 and the lower rail 3.

Each second vertical wall 14 of the upper rail 4 includes a longitudinal middle portion including a tetragonal through hole 14a that extends in the lateral direction. The upper end portion of each second flange 16 of the upper rail 4 includes a tetragonal cutaway portion 16b located in conformance with the positions of the through holes 14a in the longitudinal direction. Each cutaway portion 16b opens upward and extends in the lateral direction.

Referring to FIG. 3A, the second vertical walls 14 include circular shaft attachment holes 14b, 14c, which are concentric with each other and extend in the lateral direction at the front of the through holes 14a. The second vertical walls 14 support a cylindrical support shaft 22 when opposite ends of the support shaft 22 are inserted into the shaft attachment holes 14b, 14c. Hence, the axis of the support shaft 22 extends in the lateral direction.

As shown in FIG. 1, the support shaft 22 pivotally couples a lock lever 30 (lock member) in the upper rail 4 at a laterally inner side of the second vertical walls 14. The lock lever 30 selectively allows and restricts the relative movement of the lower rail 3 and the upper rail 4. More specifically, the lock lever 30 includes a stem 31, which is formed by a plate material and extends in the front-rear direction. The stem 31 is located so that vertical walls 32 that extend from the stem 31 in the longitudinal direction are arranged beside each other in the lateral direction. Upper edges of the vertical walls 32 are connected to each other by a connection wall 33 in the lateral direction at front ends of the vertical walls 32. Also, the upper edges are connected to each other by a top board 34 at rear ends of the vertical walls 32.

The vertical walls 32 each include an oblong hole 35 that extends in the front-rear direction at vertically the same position as the support shaft 22 (shaft attachment holes 14b, 14c). The bore width of the oblong hole 35 in the minor axis direction (vertical direction) is set to be the same as the diameter of the support shaft 22. When the vertical walls 32 of the stem 31 are located between the second vertical walls 14 of the upper rail 4 in the lateral direction, the oblong holes 35 receives the support shaft 22, the opposite ends of which are inserted into the shaft attachment holes 14b, 14c. This couples the stem 31 to the upper rail 4 in a vertically pivotal manner and allows for the front-rear movement in a range of the oblong holes 35.

Figure 3B:
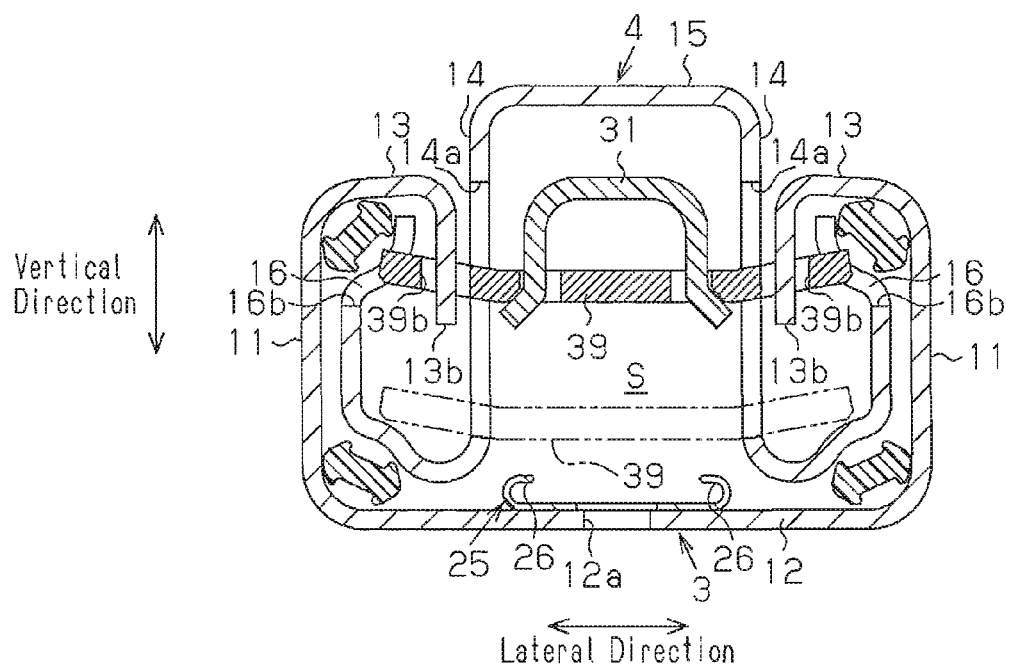
FIG. 3B is a cross-sectional view taken along line 3B-3B in FIG. 2.

The lock lever 30 also includes a lock plate 39, which is formed by a plate fixed to a lower rear end of the stem 31. Referring to FIG. 3B, the lock plate 39 extends in the front-rear direction and the lateral direction so that the lock plate 39 laterally extends through the through holes 14a and the cutaway portions 16b. The lock plate 39 includes engagement holes 39b that are vertically open and opposed to the first flanges 13. A plurality (in present embodiment, three) of the engagement holes 39b are arranged in the front-rear direction at the predetermined interval in conformance with a plurality (three) of the engagement claws 13b that are adjacent to one another in the longitudinal direction of the lower rail 3.

As indicated by the solid line in FIG. 3B, when the lock lever 30 pivots about the support shaft 22 to lift the lock plate 39, the corresponding engagement claws 13b can be fitted into the engagement holes 39b. The fitting of the corresponding engagement claws 13b into the engagement holes 39b restricts the relative movement of the lower rail 3 and the upper rail 4. However, as indicated by the double-dashed line in FIG. 3B, when the lock lever 30 pivots about the support shaft 22 to lower the lock plate 39, the engagement holes 39b are disengaged from the corresponding engagement claws 13b. This cancels the restriction of the relative movement of the lower rail 3 and the upper rail 4.

The lateral dimension of the lock plate 39 is set to be shorter than the lateral distance between the second flanges 16 below the cutaway portions 16b. Thus, when the relative movement of the lower rail 3 and the upper rail 4 is restricted, the lock plate 39 laterally extends through the cutaway portions 16b. However, when the relative movement of the lower rail 3 and the upper rail 4 is cancelled, the lock plate 39 does not interfere with the second flanges 16.

As shown in FIG. 1, a lock spring 50, which is formed by a single linear material, is located in the upper rail 4. The lock spring 50 is U-shaped and open frontward in a plan view. The lock spring 50 includes a wedge portion 53 that is bulged upward at a longitudinally middle position. The lock spring 50 also includes an upwardly bent rear end defining a first hook end 54. Additionally, the lock spring 50 includes a front end defining a second hook end 55. Also, referring to FIG. 2, the lock spring 50 is supported by components such as the upper rail 4. More specifically, when the lock spring 50 is moved toward the support shaft 22 from above the support shaft 22, the support shaft 22 is held in the wedge portion 53. The first hook end 54 is inserted through and fixed to the lock plate 39 from below the lock plate 39. When the second hook end 55 is in contact with a lower surface of the cover wall 15, the lock spring 50 is supported by components such as the upper rail 4.

At this time, the lock spring 50 pivotally urges the lock lever 30 in a direction in which the lock plate 39 is lifted at the first hook end 54, that is, a direction in which the corresponding engagement claws 13b are fitted into the engagement holes 39b. Also, the lock spring 50 uses the reaction force to urge the support shaft 22 downward at the wedge portion 53, that is, in a direction intersecting with a major axis direction of the oblong holes 35. This restricts the front-rear movement of the support shaft 22 in the oblong holes 35.

The releasing handle 6 is formed by bending a tubular material. The releasing handle 6 is inserted into the upper rail 4 from a front open end of the upper rail 4. When a front end of the stem 31 is inserted into the upper rail 4, the releasing handle 6 is coupled to the lock lever 30. Thus, the releasing handle 6 basically pivots integrally with the lock lever 30 about the support shaft 22. When a front end of the releasing handle 6 is lifted, the releasing handle 6 and the lock lever 30 pivot together in a direction which the lock plate 39 is lowered about the support shaft 22 against the urging force of the lock spring 50, that is, a direction in which the engagement holes 39b disengage from the corresponding engagement claws 13b.

Here, it is assumed that the operation force of the releasing handle 6 is not applied. In this case, the releasing handle 6 and the lock lever 30 are pivoted together by the urging force of the lock spring 50 in a direction in which the lock plate 39 is lifted about the support shaft 22, that is, a direction in which the engagement holes 39b are engaged into the corresponding engagement claws 13b. This restricts the relative movement of the lower rail 3 and the upper rail 4 in the above manner and maintains the front-rear position of the seat 5, which is supported by the upper rail 4.

Subsequently, the releasing handle 6 may be operated so that the front end of the releasing handle 6 is lifted upward. In this case, the releasing handle 6 and the lock lever 30 pivot together against the urging force of the lock spring 50 in the direction in which the lock plate 39 is lowered about the support shaft 22, that is, the direction in which the engagement holes 39b disengage from the corresponding engagement claws 13b. This cancels the restriction of the relative movement of the lower rail 3 and the upper rail 4 in the above manner. Consequently, the position of the seat 5, which is supported by the upper rail 4, may be adjusted in the front-rear direction.

Figure 4A:
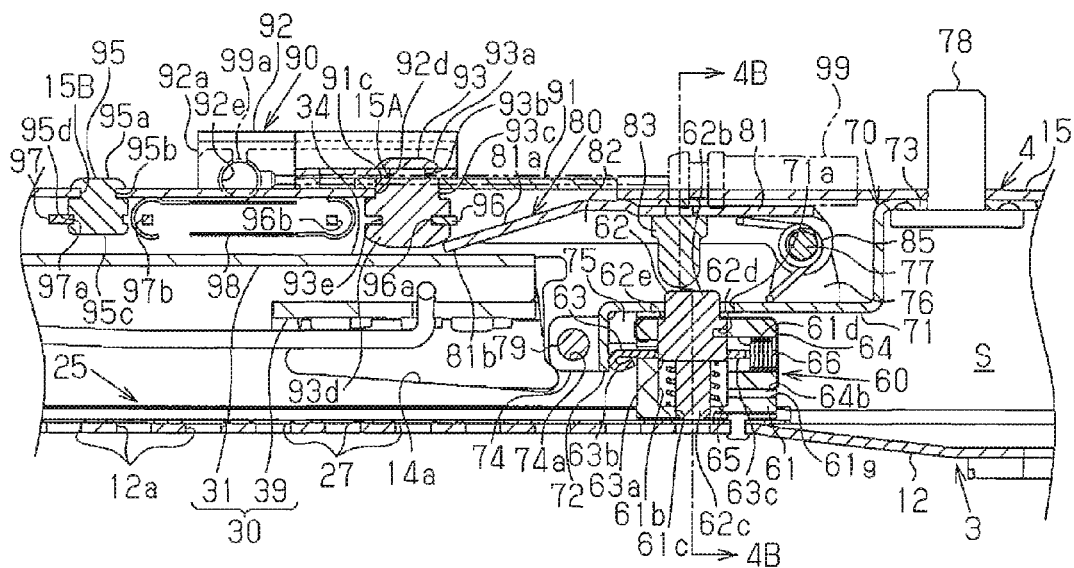
FIG. 4A is a vertical cross-sectional view showing a state in which relative movement is restricted.
Figure 4B:
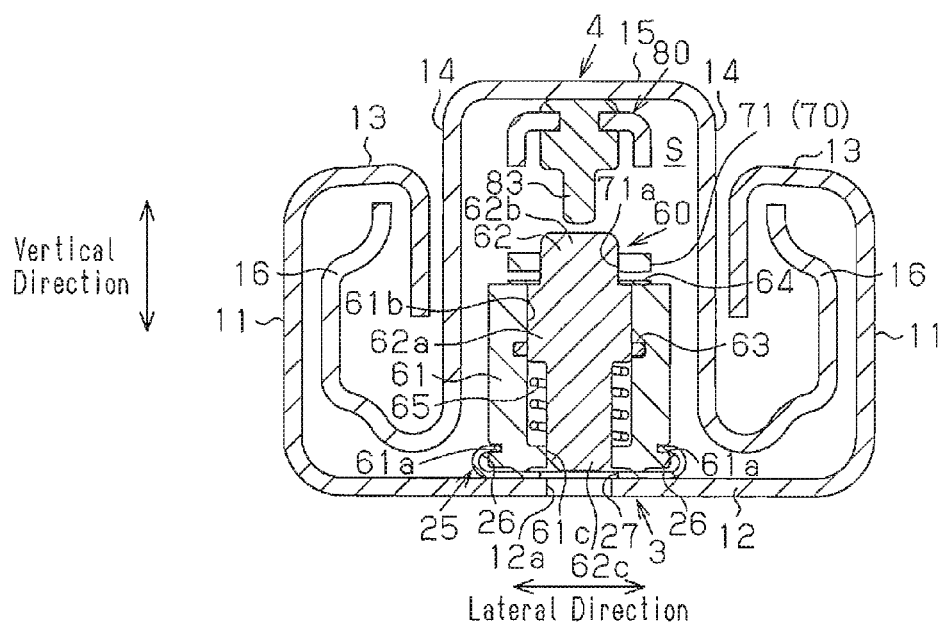
FIG. 4B is a cross-sectional view taken along line 4B-4B in FIG. 4A.

As shown in FIGS. 4A and 4B, the bottom wall 12 of the lower rail 3 includes circular lower engagement holes 12a, which are arranged in the longitudinal direction at the predetermined interval. An elongated memory guide 25, which is formed by a plate material having a width that is shorter than the distance between the second vertical walls 14 of the upper rail 4, extends on the bottom wall 12 along the lower engagement holes 12a. The memory guide 25 includes two laterally opposite ends bent laterally inward to oppose to each other, which define two guide claws 26. The memory guide 25 has a C-shaped cross-section. The memory guide 25 includes a laterally middle portion including circular insertion holes 27, which are respectively opposed to the lower engagement holes 12a. Thus, the insertion holes 27 are also arranged in the longitudinal direction of the lower rail 3 at the predetermined interval. The inner diameter of each insertion hole 27 is set to be larger than the inner diameter of each lower engagement hole 12a.

Figure 6:
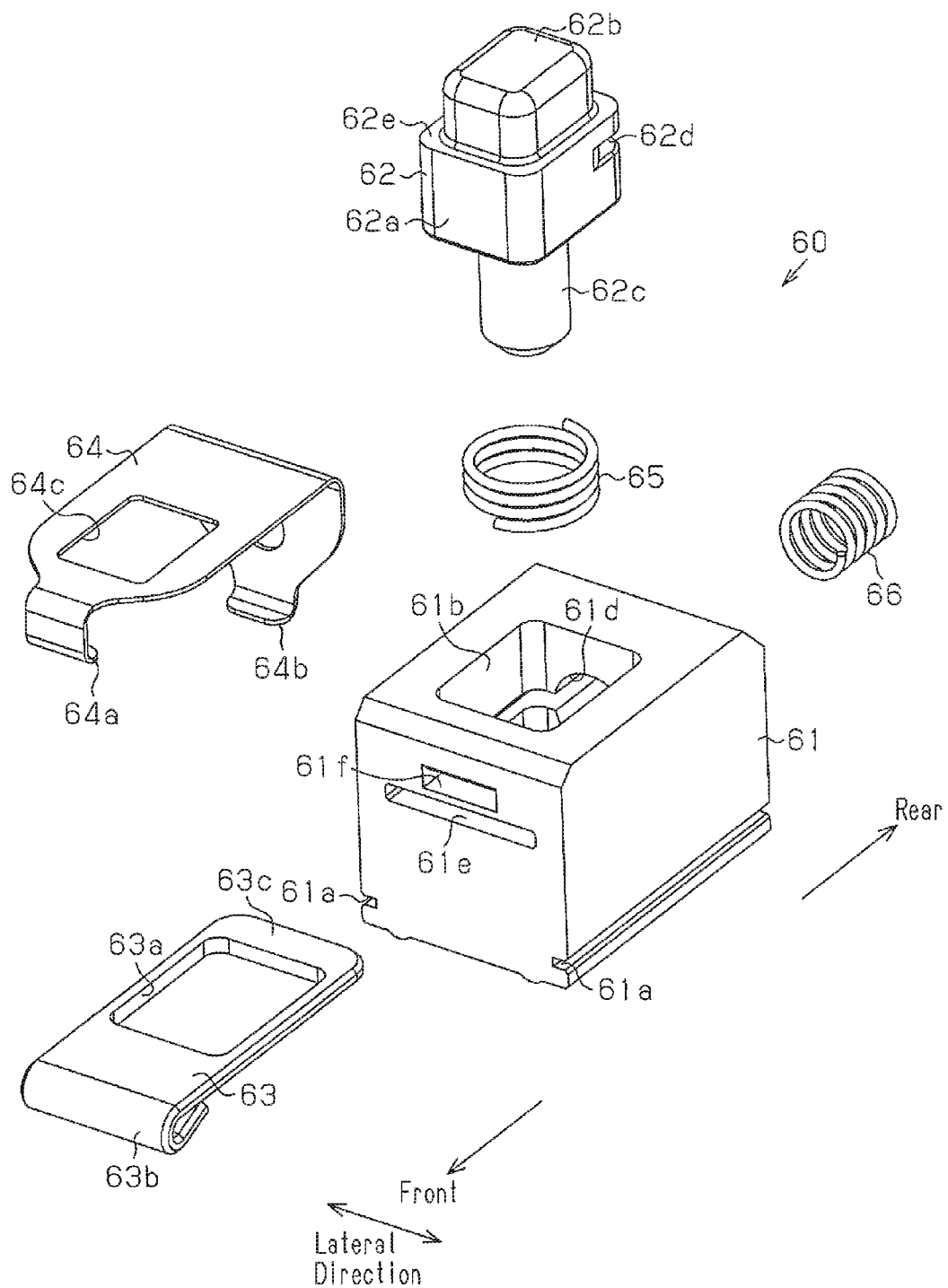
FIG. 6 is an exploded perspective view of a memory piece.

A memory piece 60 is located on the memory guide 25. Referring to FIG. 6, the memory piece 60 includes a memory base 61, a memory pin 62, an engagement plate 63, a separation restriction plate 64, a first urging member 65 (memory piece urging member), and a second urging member 66. The first urging member 65 and the second urging member 66 are each formed by, for example, a coil spring.

The memory base 61 has the same width as the memory guide 25 and is block-shaped. The memory base 61 is movable along the memory guide 25 (lower rail 3) in the front-rear direction (front-rear direction of seat). More specifically, two guide grooves 61a extend from laterally opposite surfaces of the memory base 61 in a laterally inward direction toward each other over the entire length of the memory base 61 in the front-rear direction. When the guide claws 26 of the memory guide 25 are engaged with the guide grooves 61a and slidable in the front-rear direction, the memory base 61 moves along the memory guide 25 in the front-rear direction while guided by the guide claws 26.

The memory base 61 includes a tetragonal guide hole 61b that opens upward. The memory base 61 also includes a circular insertion hole 61c, which has the same inner diameter as the lower engagement holes 12a and extends through a bottom wall defining the guide hole 61b. The guide hole 61b of the memory base 61 accommodates the first urging member 65. The memory pin 62 is attached by being inserted through the first urging member 65. The memory pin 62 includes a body 62a, which is has the form of a tetragonal post in conformance with the contour of the guide hole 61b. The guide hole 61b guides the body 62a so that the memory pin 62 moves in the vertical direction. When the body 62a is located on the first urging member 65, the memory pin 62 is constantly urged in an upward movement direction.

The memory pin 62 includes a head 62b that has the form of a tetragonal post, which is smaller than the body 62a in the lateral and front-rear directions, and projects upward from the body 62a. The memory pin 62 includes a cylindrical engagement portion 62c, which is concentric with the insertion hole 61c and projects downward from the body 62a through the first urging member 65. The outer diameter of the engagement portion 62c is set to be the same as the inner diameter of the insertion hole 61c (lower engagement hole 12a).

A U-shaped engaged groove 62d extends frontward from a rear surface of the body 62a at a vertically intermediate position over the entire length of the body 62a in the lateral direction. The body 62a includes an upper surface including a tetragonal ring-shaped step 62e at a position that borders on the head 62b.

The memory base 61 includes a vertically intermediate portion including a circular accommodation hole 61d, which extends between the rear surface of the memory base 61 and the guide hole 61b in the front-rear direction. The inner diameter of the accommodation hole 61d is set to be smaller than the lateral width of the guide hole 61b. The accommodation hole 61d accommodates the second urging member 66.

Additionally, the memory base 61 includes a plate guide hole 61e, which extends in the front-rear direction at a vertically middle position of the accommodation hole 61d. The plate guide hole 61e has the form of a slit extending in the lateral direction. The lateral width of the plate guide hole 61e is set to be larger than the lateral width of the guide hole 61b. Thus, the plate guide hole 61e cuts away an inner wall of each of the guide hole 61b and the accommodation hole 61d to form grooves that extend away from each other in the lateral direction. The engagement plate 63 is inserted and guided into the plate guide hole 61e from the front and slidable in the front-rear direction. More specifically, the engagement plate 63 has the form of a tetragonal plate having the same width as the lateral bore width of the plate guide hole 61e. The engagement plate 63 is fitted into the plate guide hole 61e from the front. At this time, when entering the accommodation hole 61d, a rear end of the engagement plate 63 comes into contact with and is pressed by the second urging member 66. Thus, the engagement plate 63 is constantly urged frontward.

The engagement plate 63 includes a middle portion including a tetragonal through hole 63a. The lateral width of the through hole 63a is set to be the same as the lateral width (width of body 62a) of the guide hole 61b. The front-rear width of the through hole 63a is set to be larger than the front-rear width (front-rear dimension of body 62a) of the guide hole 61b.

When the memory pin 62 is urged upward by the first urging member 65 in the guide hole 61b, a portion of the body 62a that is located below the engaged groove 62d basically extends through the through hole 63a. Thus, frontward movement of the engagement plate 63 urged by the second urging member 66 is restricted when a seat rearward edge 63c defining the through hole 63a is in contact with the body 62a. At this time, vertical movement of the memory pin 62 is allowed in the guide hole 61b and the through hole 63a.

However, when the memory pin 62 moves downward in the guide hole 61b against the urging force of the first urging member 65 and the engaged groove 62d reaches the position of the engagement plate 63 in the vertical direction, the seat rearward edge 63c defining the through hole 63a is moved frontward by the urging force of the second urging member 66 and fitted into the engaged groove 62d. At this time, the vertical movement of the memory pin 62 is restricted in the guide hole 61b and the through hole 63a (refer to FIG. 5A).

The engagement plate 63 includes a front end that is bent downward and rearward defining an arcuate pressed portion 63b.

The memory base 61 includes a tetragonal front hook hole 61f, which extends between the front surface of the memory base 61 and the guide hole 61b in the front-rear direction above the plate guide hole 61e. Additionally, the memory base 61 includes a tetragonal rear hook hole 61g, which extends between the rear surface of the memory base 61 and the guide hole 61b in the front-rear direction below the accommodation hole 61d. The separation restriction plate 64 is fixed to the memory base 61 at the front hook hole 61f and the rear hook hole 61g. More specifically, the separation restriction plate 64, which is formed by a plate material, extends over the upper surface of the memory base 61 and includes a front end and a rear end that extend downward defining a front hook 64a and a rear hook 64b, respectively. When the separation restriction plate 64 is in contact with the upper surface of the memory base 61 and the front hook 64a and the rear hook 64b are respectively fitted into the front hook hole 61f and the rear hook hole 61g, the separation restriction plate 64 is fixed to the memory base 61.

The separation restriction plate 64 includes a middle portion including a tetragonal head insertion hole 64c. The lateral width and the front-rear width of the head insertion hole 64c are respectively set to be the same as the width and the front-rear length of the head 62b. The head 62b of the memory pin 62 is urged upward by the first urging member 65 and inserted into the head insertion hole 64c. Thus, the upward movement of the memory pin 62 urged by the first urging member 65 is restricted when the step 62e is in contact with an edge defining the head insertion hole 64c. More specifically, the separation restriction plate 64 limits the uppermost position of the memory pin 62 and restricts removal of the memory pin 62 in the upper direction. The separation restriction plate 64 is in contact with and pressed against the rear end of the second urging member 66, which urges the engagement plate 63 frontward, and also restricts removal of the second urging member 66 in the rear direction.

As shown in FIG. 4A, when the memory pin 62 is moved upward to bring the step 62e in contact with the edge defining the head insertion hole 64c, that is, when the step 62e restricts the upward movement of the memory pin 62, the head 62b greatly projects upward from the separation restriction plate 64. At this time, the engagement portion 62c is set so that the length of projection of a distal end of the engagement portion 62c from the insertion hole 61c is subtle or null. Thus, the memory piece 60 is movable in the longitudinal direction of the memory guide 25 (bottom wall 12).

Figure 5A:
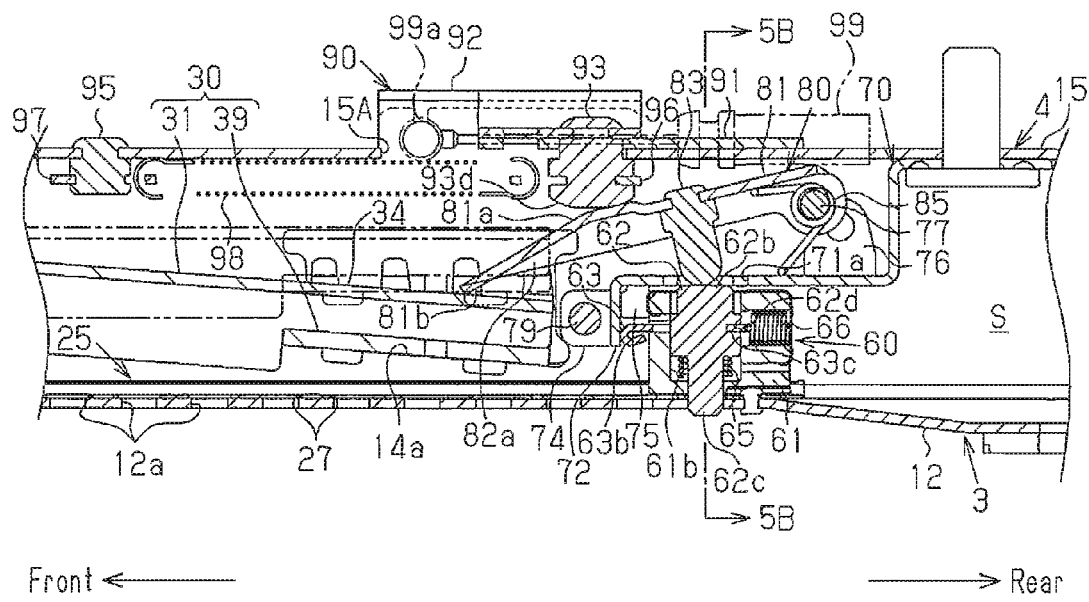
FIG. 5A is a vertical cross-sectional view showing a state in which restriction of relative movement is cancelled when a seatback is collapsed forward.

However, as shown in FIG. 5A, when the memory pin 62 is moved downward and the seat rearward edge 63c, which defines the through hole 63a in the engagement plate 63, is fitted into the engaged groove 62d, the vertical movement of the memory pin 62 is restricted. In this state, the engagement portion 62c greatly projects downward from the memory base 61. Thus, at this time, if one of the lower engagement holes 12a (insertion holes 27) is located under the engagement portion 62c, the distal end of the engagement portion 62c is inserted through the insertion hole 27 and the lower engagement hole 12a. This fixes the memory piece 60 to the lower rail 3 (bottom wall 12) and disables longitudinal movement of the memory piece 60.

As shown in FIG. 4A, a stopper member 70, which is formed by a plate, is fixed to and supported by the upper rail 4 at the rear of the lock lever 30. More specifically, the stopper member 70 includes a support wall 71, which extends in the front-rear direction at a position above the memory base 61 and below the memory pin 62 (head 62b) when the memory pin 62 is projected from the memory base 61 by a relatively large amount. Additionally, the stopper member 70 includes a pressing piece 72, which is wider than the support wall 71 and extends downward from the front end of the support wall 71. The stopper member 70 also includes an L-shaped attachment piece 73, which extends upward and rearward from the rear end of the support wall 71. The stopper member 70 is fastened to the upper rail 4 by a fastener 78 that vertically extends through the attachment piece 73 and the cover wall 15.

Additionally, the stopper member 70 includes two supported flanges 74, which extend frontward from laterally opposite ends of the pressing piece 72. The supported flanges 74 each include a circular shaft insertion hole 74a that extends in the lateral direction. The lateral distance between the shaft insertion holes 74a is set to be the same as the lateral distance between the second vertical walls 14 of the upper rail 4. When a cylindrical fixing pin 79 is inserted into the shaft insertion holes 74a, two ends of the fixing pin 79 are inserted through the second vertical walls 14. Hence, the axis of the fixing pin 79 extends in the lateral direction.

In the above structure, the stopper member 70 is supported by the fastener 78 and the fixing pin 79 and firmly fixed to the upper rail 4 at a front position and a rear position.

The stopper member 70 includes two stopper pieces 75, which extend downward from laterally opposite sides of the front end of the support wall 71 along the pressing piece 72. The rear sides of the stopper pieces 75 are opposed to the memory base 61 at a position above the engagement plate 63. The pressing piece 72 is opposed in the rearward direction to the engagement plate 63. More specifically, when the stopper member 70 moves rearward together with the upper rail 4, the stopper pieces 75 are able to contact the memory base 61, and the pressing piece 72 is able to contact the engagement plate 63 (pressed portion 63b). Particularly, when the stopper pieces 75 are in contact with the memory base 61, the pressing piece 72 has moved the memory pin 62 rearward against the urging force of the second urging member 66. Consequently, the head 62b of the memory pin 62, which is urged upward by the first urging member 65, is greatly projected upward from the separation restriction plate 64.

The support wall 71 includes a middle portion including an upper engagement hole 71a that extends in the vertical direction. The lateral width and the front-rear width of the upper engagement hole 71a are respectively set to be the same as the width and the front-rear length of the head 62b of the memory pin 62. When the stopper pieces 75 of the stopper member 70 are in contact with the memory base 61, the head 62b of the memory pin 62, which is urged upward by the first urging member 65, is inserted through the upper engagement hole 71a.

Thus, the memory pin 62 (memory piece 60) is movable along the lower rail 3 (memory guide 25) in the front-rear direction. However, the memory pin 62 is immovable relative to the upper rail 4, to which the stopper member 70 is fixed, in the front-rear direction. More specifically, when projected upward from the memory base 61, the memory pin 62 is engaged with the upper rail 4 and disengaged from the lower rail 3. Then, when the upper rail 4 moves relative to the lower rail 3 in the front-rear direction, the memory pin 62 (memory piece 60) moves integrally with the upper rail 4 in the front-rear direction. However, when the front-rear movement of the upper rail 4 relative to the lower rail 3 is restricted by the lock lever 30, the front-rear movement of the memory pin 62 (memory piece 60) is also restricted. At this time, one of the lower engagement holes 12a (insertion holes 27) is set to be located under the engagement portion 62c of the memory pin 62.

As described above, when the engagement portion 62c of the memory pin 62 greatly projects downward from the memory base 61 and the distal end extends through the insertion holes 61c, 27 and the lower engagement hole 12a, the memory piece 60 is fixed to the lower rail 3 (bottom wall 12) and immovable in the longitudinal direction. At this time, the head 62b of the memory pin 62 is set to be located below the support wall 71. Consequently, for example, separation of the head 62b of the memory pin 62 from the upper engagement hole 71a allows the upper rail 4 to move frontward leaving the memory piece 60 behind. More specifically, when projecting downward from the memory base 61, the memory pin 62 is engaged with the lower rail 3 and disengaged from the upper rail 4.

The stopper member 70 includes two attachment flanges 76, which extend upward from laterally opposite sides of the rear end of the support wall 71. A memory link 80 is pivotally coupled to the stopper member 70 at a laterally inner side of the attachment flanges 76 by an attachment pin 77, the axis of which extends in the lateral direction. More specifically, the memory link 80, which is formed by a plate, includes a rectangular top board 81 that extends in the front-rear direction. The memory link 80 also includes two vertical walls 82, which extend downward from laterally opposite sides of the top board 81. The memory link 80 is pivotally coupled to the two attachment flanges 76 by the attachment pin 77, which extends in the lateral direction, at the rear ends of the vertical walls 82 located between the attachment flanges 76.

The top board 81 extends above and along the stopper member 70 in the front-rear direction. The top board 81 includes a front end that is inclined downward toward the front and defines a pressed portion 81a having an inclined surface. The pressed portion 81a reaches an upper rear end of the lock lever 30 (top board 34). The pressed portion 81a includes a front end that projects downward from the lower ends of the vertical walls 82 and defines a claw-shaped pressing portion 81b. The change from FIG. 4A to FIG. 5A shows the memory link 80 pivoted about the attachment pin 77 in a counterclockwise direction (hereafter, also referred to as "releasing direction") as viewed in the drawing. In this case, the lock lever 30, which is pressed by the pressing portion 81b, pivots about the support shaft 22 in a direction in which the lock plate 39 is lowered, that is, a direction in which the engagement holes 39b disengage from the corresponding engagement claws 13b, against the urging force of the lock spring 50.

Additionally, a tongue-shaped pressing projection 83 is fixed to the top board 81 at the rear of the pressed portion 81a and projects downward toward the upper engagement hole 71a. The change from FIG. 4A to FIG. 5A shows the memory link 80 pivoted about the attachment pin 77 in the counterclockwise direction (releasing direction). In this case, the pressing projection 83 is inserted into the upper engagement hole 71a. At this time, if the head 62b of the memory pin 62 is fitted in the upper engagement hole 71a, the memory pin 62 is pressed by the pressing projection 83 and projected downward out of the memory base 61. Consequently, the vertical movement of the memory pin 62 is restricted by the engagement plate 63 in the manner described above. When the memory link 80 pivots to a position where the vertical movement of the memory pin 62, which is pressed by the pressing projection 83, is restricted by the engagement plate 63, the lock lever 30, which is pressed by the pressing portion 81b, is set to reach a pivot position where the engagement holes 39b of the lock plate 39 are disengaged from the corresponding engagement claws 13b.

A memory link urging member 85 formed by, for example, a torsion coil spring is wound around the attachment pin 77. The memory link urging member 85 includes one end, which engages the stopper member 70 (support wall 71), and the other end, which engages the memory link 80 (top board 81). The memory link urging member 85 pivotally urges the memory link 80 in a clockwise direction as viewed in the drawing. The memory link 80 is configured to be held at an initial pivot position, where the lock lever 30 and the memory piece 60 (memory pin 62) are released, when urging force of the memory link urging member 85 is applied.

Figure 7:
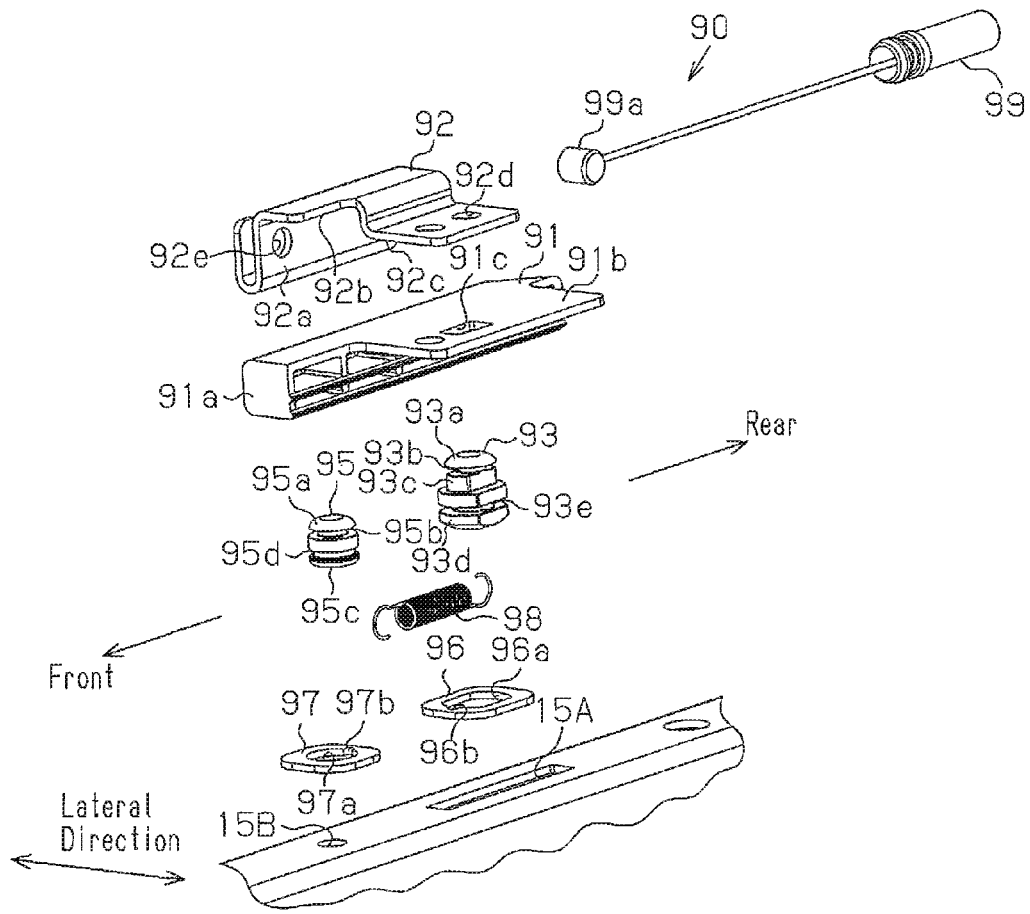
FIG. 7 is an exploded perspective view of an actuation slider and its peripheral structure.

The cover wall 15 of the upper rail 4 includes a rectangular guide bore 15A, which extends in the vertical direction and is opposed to the front end of the memory link 80. The cover wall 15 supports an actuation slider 90, which functions as a slide member and is slidable in the front-rear direction, at a location proximate to the memory link 80. Referring to FIG. 7, the actuation slider 90 includes a guide member 91, a wire attachment member 92, and a pressing member 93.

The guide member 91 includes a block-shaped guide portion 91a, which extends in the front-rear direction at a laterally outer side of one of the second vertical walls 14 of the upper rail 4. The guide member 91 also includes a plate-shaped attachment piece 91b, which extends laterally inward from a longitudinal intermediate portion of the guide portion 91a along the cover wall 15. The attachment piece 91b includes a rectangular engagement hole 91c, which is vertically open and opposed to the guide bore 15A and. The lateral width of the engagement hole 91c is set to be the same as the lateral width of the guide bore 15A. The front-rear width of the engagement hole 91c is set to be smaller than the front-rear width of the guide bore 15A.

The wire attachment member 92, which is formed by a plate material, includes a wire attachment portion 92a having the form of a U-shaped groove that extends in the front-rear direction at a laterally outer side of the guide portion 91a of the guide member 91. The wire attachment member 92 also includes a plate-shaped flange 92b, which extends from a laterally inner upper end of the wire attachment portion 92a toward the laterally inner side, and an L-shaped attachment piece 92c, which extends from the rear end of the flange 92b downward toward the laterally inner side. The attachment piece 92c includes a circular insertion hole 92d, which is vertically open and opposed to the engagement hole 91c. The inner diameter of the insertion hole 92d is set to be the same as the lateral width of the engagement hole 91c. When the attachment piece 92c is placed on the attachment piece 91b, the insertion hole 92d of the wire attachment member 92 opens to the central part of the engagement hole 91c. The wire attachment portion 92a defines two vertical walls, which are vertically arranged and each include a front end including a circular attachment hole 92e that opens in the lateral direction.

The pressing member 93 is inserted into the guide member 91 and the wire attachment member 92 in addition to the cover wall 15 of the upper rail 4. More specifically, the pressing member 93 includes a pot-shaped head 93a that is upwardly bulged. The pressing member 93 also includes a cylindrical insertion portion 93b, which has a smaller diameter than the head 93a and is connected to the lower end of the head 93a. The pressing member 93 further includes a tetragonal fitting portion 93c, which is connected to the lower end of the insertion portion 93b. The outer diameter of the insertion portion 93b is set to be the same as the inner diameter of the insertion hole 92d. The dimensions of the fitting portion 93c in the lateral and front-rear directions are set to be the same as the widths of the engagement hole 91c in the lateral and front-rear directions.

Additionally, the pressing member 93 includes a pressing portion 93d, which has an outer diameter that is larger than the dimension of the fitting portion 93c in the front-rear direction and is connected to the lower portion of the fitting portion 93c. The pressing portion 93d is pot-shaped and downwardly bulged. The insertion portion 93b of the pressing member 93 is inserted into the insertion hole 92d. The fitting portion 93c of the pressing member 93 is fitted into the engagement hole 91c and inserted into the guide bore 15A allowing for the front-rear movement of the fitting portion 93c. At this time, the head 93a of the pressing member 93 is in contact with an upper rim of the insertion hole 92d. Also, the pressing portion 93d is in contact with a lower rim of the guide bore 15A. This restricts the separation of the pressing member 93 from the guide member 91. An annular support groove 93e extends around a vertically intermediate part of the pressing portion 93d toward an inner side.

In the above structure, the actuation slider 90 is slidable relative to the cover wall 15 in the front-rear direction in a range from where the fitting portion 93c of the pressing member 93 contacts a front wall defining the guide bore 15A to where the fitting portion 93c of the pressing member 93 contacts a rear wall defining the guide bore 15A. As shown in FIG. 4A, when the fitting portion 93c is in contact with the front wall defining the guide bore 15A, the lower end of the pressing member 93 (pressing portion 93d) is in contact with or proximate to the front end of the memory link 80, which is located at the initial pivot position. The change from FIG. 4A to FIG. 5A shows the actuation slider 90 moved rearward along the upper rail 4. This pivots the memory link 80, which is pressed by the lower end of the pressing portion 93d, about the attachment pin 77 in the releasing direction against the urging force of the memory link urging member 85.

The cover wall 15 of the upper rail 4 includes a circular attachment hole 15B, which is located at the front of the guide bore 15A and extends in the vertical direction. A spring support member 95 is attached to the attachment hole 15B. The spring support member 95 includes a pot-shaped head 95a that is upwardly bulged. The spring support member 95 also includes a cylindrical insertion portion 95b, which has a smaller diameter than the head 95a and is connected to the lower end of the head 95a. Further, the spring support member 95 includes a support portion 95c, which has a larger diameter than the insertion portion 95b and is connected to the lower end of the insertion portion 95b. The support portion 95c is port-shaped and downwardly bulged. The outer diameter of the insertion portion 95b is set to be the same as the inner diameter of the attachment hole 15B. The insertion portion 9b of the spring support member 95 is inserted into the attachment hole 15B. The head 95a of the spring support member 95 is in contact with an upper rim of the attachment hole 15B while the support portion 95c is in contact with a lower rim of the attachment hole 15B. This restricts the separation of the spring support member 95 from the cover wall 15. An annular support groove 95d extends around a vertically intermediate part of the support portion 95c toward an inner side.

An annular movable engagement plate 96 is fixed to the support groove 93e of the pressing member 93. The movable engagement plate 96 includes an insertion hole 96a, which vertically extends to receive the pressing portion 93d. An engagement groove 96b recessed toward the front from the middle of the front wall that defines the insertion hole 96a. The movable engagement plate 96 is fixed to the pressing member 93 when a rear wall defining the insertion hole 96a engages the support groove 93e.

An annular fixed engagement plate 97 is fixed to the support groove 95d of the spring support member 95. The fixed engagement plate 97 includes an insertion hole 97a, which vertically communicates to receive the support portion 95c. The fixed engagement plate 97 includes an engagement groove 97b recessed toward the rear from the middle of the rear wall that defines the insertion hole 97a. The fixed engagement plate 97 is fixed to the spring support member 95 when a front wall defining the insertion hole 97a engages the support groove 95d.

A slider urging member 98 is formed by, for example, a coil spring, and includes two ends that engage the engagement groove 96b of the movable engagement plate 96 and the engagement groove 97b of the fixed engagement plate 97. The slider urging member 98 urges the actuation slider 90 frontward with components such as the movable engagement plate 96. Thus, the urging force of the slider urging member 98 holds the actuation slider 90 in a state in which the fitting portion 93c of the pressing member 93 is basically in contact with the front wall defining the guide bore 15A (at initial position where memory link 80 is released).

A releasing cable 99 includes a first end 99a (one end) that engages the attachment holes 92e of the wire attachment member 92. More specifically, the first end 99a has the form of a cylinder the outer diameter of which is the same as the inner diameter of the attachment holes 92e and the axis of which extends in the lateral direction. When distal portions of the first end 99a are inserted into the attachment holes 92e, the first end 99a engages the wire attachment member 92.

The releasing cable 99 extends rearward from the attachment holes 92e. The releasing cable 99 includes a second end (further end) that is coupled to the seatback 8. When the seatback 8 is inclined frontward (hereafter, also referred to as "collapsed forward") from a seating position, the wire attachment member 92 (actuation slider 90) may be pulled rearward so that the releasing cable 99 moves the actuation slider 90 rearward against the urging force of the slider urging member 98. At this time, as described above, the memory link 80 is pressed by the lower end of the pressing portion 93d and pivots about the attachment pin 77 in the releasing direction against the urging force of the memory link urging member 85.

In FIGS. 4A and 4B, the seatback 8 is not collapsed forward, and the actuation slider 90 is held in the initial position where the memory link 80 is released by the urging force of the slider urging member 98. Additionally, the memory link 80 is held in the initial pivot position where the lock lever 30 and the memory piece 60 (memory pin 62) are released by the urging force of the memory link urging member 85. Further, the memory pin 62, which is projected from the memory base 61 by the first urging member 65, is engaged with the stopper member 70 (upper rail 4) and disengaged from the lower rail 3. At this time, as described above, one of the lower engagement holes 12a (insertion holes 27) is located under the memory pin 62 (engagement portion 62c).

In this state, when the operation force of the releasing handle 6 is not applied, the movement of the upper rail 4 relative to the lower rail 3 is restricted by the lock lever 30 and the movement of the memory pin 62 (memory piece 60) is also restricted in the manner described above.

When the releasing handle 6 is operated, the restriction of the movement of the upper rail 4 relative to the lower rail 3, which is performed by the lock lever 30, is cancelled. Also, the memory pin 62 (memory piece 60) becomes movable together with the upper rail 4. More specifically, when the upper rail 4 is moved in the front-rear direction subsequent to the operation of the releasing handle 6, the memory piece 60 moves integrally with the upper rail 4 in the front-rear direction.

Thus, when the seatback 8 is located at the seating position, the memory piece 60 moves integrally with the upper rail 4 in the front-rear direction.

Figure 5B:
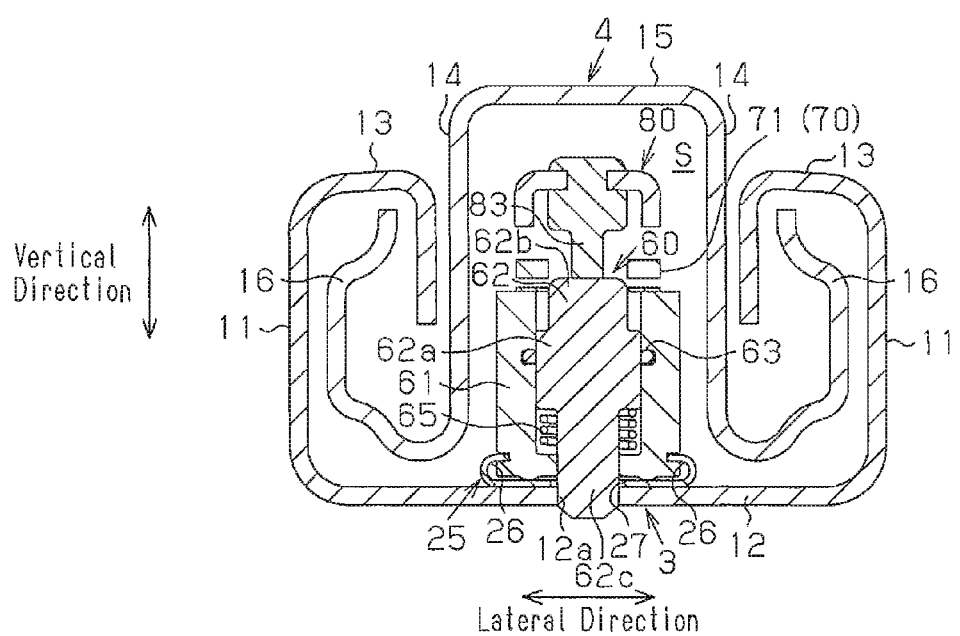
FIG. 5B is a cross-sectional view taken along line 5B-5B in FIG. 5A.

When the seatback 8 is collapsed forward in the state shown in FIGS. 4A and 4B, the actuation slider 90 is pulled by the releasing cable 99 and moved rearward along the upper rail 4 against the urging force of the slider urging member 98 as shown in FIGS. 5A and 5B. At this time, the guide portion 91a of the guide member 91 contacts and slides along an outer surface of the second vertical wall 14. This further stabilizes the rearward movement of the pressing member 93 along the guide bore 15A. The memory link 80 is pressed by the pressing portion 93d of the pressing member 93 and pivoted in the releasing direction.

Accordingly, the lock lever 30, which is pressed by the pressing portion 81b of the memory link 80, cancels (unlocks) the restriction of the movement of the upper rail 4 relative to the lower rail 3. At the same time, the memory pin 62 is pressed by the pressing projection 83 of the memory link 80 and projected downward out of the memory base 61 to be engaged with the lower rail 3 and disengaged from the stopper member 70 (upper rail 4) (memory actuation). This enables the upper rail 4 to move frontward while the memory pin 62 (memory piece 60) remains on the lower rail 3.

The lock lever 30 is continuously pressed by the pressing portion 81b of the memory link 80 as long as the seatback 8 is collapsed forward. This maintains the unrestricted movement of the upper rail 4 relative to the lower rail 3. More specifically, when the seatback 8 is collapsed forward, the upper rail 4 (seat 5) is allowed to move frontward until the frontward movement is restricted by a known stopper mechanism. This is the so-called walk-in operation. If the seatback 8 is lifted to cancel the collapsed state before the upper rail 4 is moved frontward or when the upper rail 4 is moved to any frontward position, the lock lever 30 is released from the pressing portion 81b of the memory link 80, which returns to the initial pivot position, and restricts the movement of the upper rail 4 relative to the lower rail 3.

When the upper rail 4 is moved frontward and then rearward while the seatback 8 is collapsed forward, the pressing piece 72 of the stopper member 70 first contacts the engagement plate 63 (pressed portion 63b). At this time, the stopper pieces 75 of the stopper member 70 are separated from the memory base 61 in the front-rear direction.

Then, when the upper rail 4 is further moved rearward, the stopper pieces 75 of the stopper member 70 come in contact with the memory base 61 and restrict the rearward movement of the upper rail 4. Thus, when the seatback 8 is collapsed forward, the stopper pieces 75 (upper rail 4) of the stopper member 70 contact the memory base 61 if moved in the seat-rearward direction. More specifically, the upper rail 4 stops at a position (memorized position) where the upper rail 4 was located prior to the frontward movement when the seatback 8 was collapsed forward. At the same time, the engagement plate 63 is pressed and moved rearward by the pressing piece 72 of the stopper member 70. This cancels the restriction of the vertical movement of the memory pin 62, which is performed by the engagement plate 63. Instead, the pressing projection 83 of the memory link 80 moves to above the memory pin 62. Thus, the upward movement of the memory pin 62 is restricted by the pressing projection 83.

When the seatback 8 is lifted to cancel the collapsed state, the actuation slider 90 is urged by the slider urging member 98 and moved frontward along the upper rail 4 to return the initial position as shown in FIG. 4A. Also, the memory link 80 is released from the pressing member 93 (pressing portion 93d) and returned to the initial pivot position.

Accordingly, the lock lever 30, which is released from the pressing portion 81b of the memory link 80, restricts the movement of the upper rail 4 relative to the lower rail 3. At the same time, the memory pin 62, which is released from the pressing projection 83 of the memory link 80, is projected out of the memory base 61 to engage with the stopper member 70 (upper rail 4) and disengage from the lower rail 3.

When the upper rail 4 is moved in the seat-rearward direction after the seatback 8 is collapsed forward and the upper rail 4 is moved frontward (in seat-frontward direction), the state prior to the movement recovers through the cancellation of the collapsed state of the seatback 8.

The operation of the present embodiment will now be described.

In the present embodiment, when the seatback is collapsed forward to perform the unlocking and the memory actuation, the actuation slider 90 moves in the front-rear direction. This reduces the space needed for the unlocking and the memory actuation.

Accordingly, the present embodiment has the advantages described below.

(1) The present embodiment allows for reduction in the space needed for the unlocking and the memory actuation performed when the seatback is collapsed forward.

(2) In the present embodiment, the pressing member 93 of the actuation slider 90 is fitted into the guide bore 15A and movable in the relative movement direction (front-rear direction). Thus, the pressing member 93 enables the actuation slider 90 to further smoothly press the memory link 80 in the releasing direction.

(3) In the present embodiment, the guide member 91 contacts and slides along the upper rail 4 to guide the movement of the pressing member 93. This further stabilizes the movement of the pressing member 93 (movement of actuation slider 90) along the guide bore 15A.

(4) In the present embodiment, the releasing cable 99 extends toward the seatback 8 from the actuation slider 90 in the relative movement direction (front-rear direction). Thus, the releasing cable 99 may be located proximate to the upper rail 4.

(5) In the present embodiment, one end of the slider urging member 98, which functions to return the actuation slider 90 to the initial position, engages the pressing member 93, which functions to press the memory link 80, through the movable engagement plate 96. This further ensures the separation of the pressing member 93 from the memory link 80.

(6) In the present embodiment, the lock lever 30, the memory piece 60, the memory link 80, the stopper member 70, and the slider urging member 98 are located in the void S defined by the lower rail 3 and the upper rail 4. Thus, only the actuation slider 90 and a portion of the spring support member 95 are basically located outside the lower rail 3 and the upper rail 4. This reduces the space used outside the rails.

When engaging the upper rail 4, the memory piece 60 is located under the upper rail 4 and not exposed to the exterior. When engaging the lower rail 3, the memory piece 60 is exposed upward to the exterior if the upper rail 4 moves in the seat-frontward direction and passes the memory piece 60. Thus, the phrase of the memory piece 60 "located in the void S defined by the lower rail 3 and the upper rail 4" more precisely means that the memory piece 60 is "located in a void formed by projecting the lower rail 3 and the upper rail 4 in the relative movement direction."

The above embodiment may be modified as follows.

In the embodiment, the first end (one end) of the slider urging member 98 may engage an appropriate portion of the actuation slider 90 other than the pressing member 93. However, the slider urging member 98 is preferably located in the upper rail 4.

In the embodiment, the releasing cable 99, which extends from the actuation slider 90 toward the seatback 8, does not have to extend in the relative movement direction.

In the embodiment, the guide member 91 (guide portion 91a) does not have to contact and slide along the outer surface of the upper rail 4. In this case, the guide member 91 may be omitted.

In the embodiment, the structure of the guide bore 15A for engaging the pressing member 93 may be omitted as long as the pressing member 93 can press the memory link 80 in the releasing direction when moving rearward.

In the embodiment, two or more members among the guide member 91, the wire attachment member 92, and the pressing member 93 may be formed integrally with each other. This reduces the number of components.

The embodiment is just one example of the memory piece 60 and its peripheral structure. For example, the engagement plate 63 and the second urging member 66 may be omitted. In this case, as described in patent document 1, a memory holding bracket only needs to be arranged. When the seatback 8 is collapsed forward and then the upper rail 4 is moved in the seat-frontward direction, the memory holding bracket is located above the memory pin 62. The memory holding bracket continuously presses the memory pin 62 downward to maintain the engagement with the lower rail 3.

In the embodiment, the movement direction of the memory pin 62 (memory piece 60) for engaging and disengaging the lower rail 3 or the upper rail 4 is not limited to the vertical direction and may correspond to, for example, the lateral direction.

In the embodiment, the memory link 80 may be pivotally coupled to an attachment pin (77) that is directly supported by the upper rail 4.

In the embodiment, the lower rail 3 may have a structure in which multiple plates are bonded through welding or the like.

In the embodiment, the upper rail 4 may have a structure in which multiple plates are coupled through welding or the like.

In the embodiment, when the seatback 8 is collapsed forward, the upper rail 4 may be moved frontward by urging force of an appropriate urging member or manually by a vehicle occupant.

In the embodiment, one set of the lower rail 3 and the upper rail 4 (vehicle seat slide device) may be arranged for the seat 5. Alternatively, three or more sets may be arranged.

In the embodiment, the relative movement direction of the lower rail and the upper rail may be, for example, the lateral direction of the vehicle.

The invention claimed is:

1. A vehicle seat slide device adapted for a seat including a seatback, the vehicle seat slide device comprising:
    a lower rail and an upper rail coupled to each other in a manner movable relative to each other;
    a lock member that selectively allows and restricts relative movement of the lower rail and the upper rail;
    a memory piece located in the lower rail, wherein the memory piece is engaged with the upper rail by urging force of a memory piece urging member, and the memory piece is engaged with the lower rail by pressing force that counters the urging force;
    a memory link pivotally coupled to the upper rail in the upper rail, wherein the memory link releases the lock member and the memory piece with urging force of a memory link urging member, and the memory link pivots in a releasing direction to press the lock member in a pivot direction in which restriction of the relative movement is cancelled and press the memory piece against the urging force of the memory piece urging member;
    a slide member coupled to the upper rail in a manner movable in a direction of the relative movement, wherein the slide member releases the memory link with urging force of a slider urging member, and the slide member moves to press the memory link in the releasing direction when the seatback is collapsed forward; and
    a stopper member fixed to the upper rail, wherein after the seatback is collapsed forward and the upper rail is moved in a seat-frontward direction, when the upper rail is moved in a seat-rearward direction, the stopper member contacts the memory piece and restricts seat-rearward movement of the upper rail at a relative position of the lower rail and the upper rail prior to the movement.

2. The vehicle seat slide device according to claim 1, wherein
    the upper rail includes a guide bore, and
    the slide member includes a pressing member fitted into the guide bore in a manner movable in the relative movement direction, wherein the pressing member presses the memory link in the releasing direction.

3. The vehicle seat slide device according to claim 1, wherein the slider urging member includes a coil spring that includes one end engaged with the pressing member.

4. The vehicle seat slide device according to claim 1, wherein the slide member includes a guide member that contacts and slides along the upper rail to guide movement of the upper rail.

5. The vehicle seat slide device according to claim 1, further comprising a releasing cable that includes one end linked to the seatback and another end coupled to the slide member, wherein
    when the seatback is collapsed forward, the releasing cable moves the slide member, and
    the releasing cable extends from the slide member toward the seatback in he relative movement direction.

* * * * *